Patented Jan. 16, 1923.

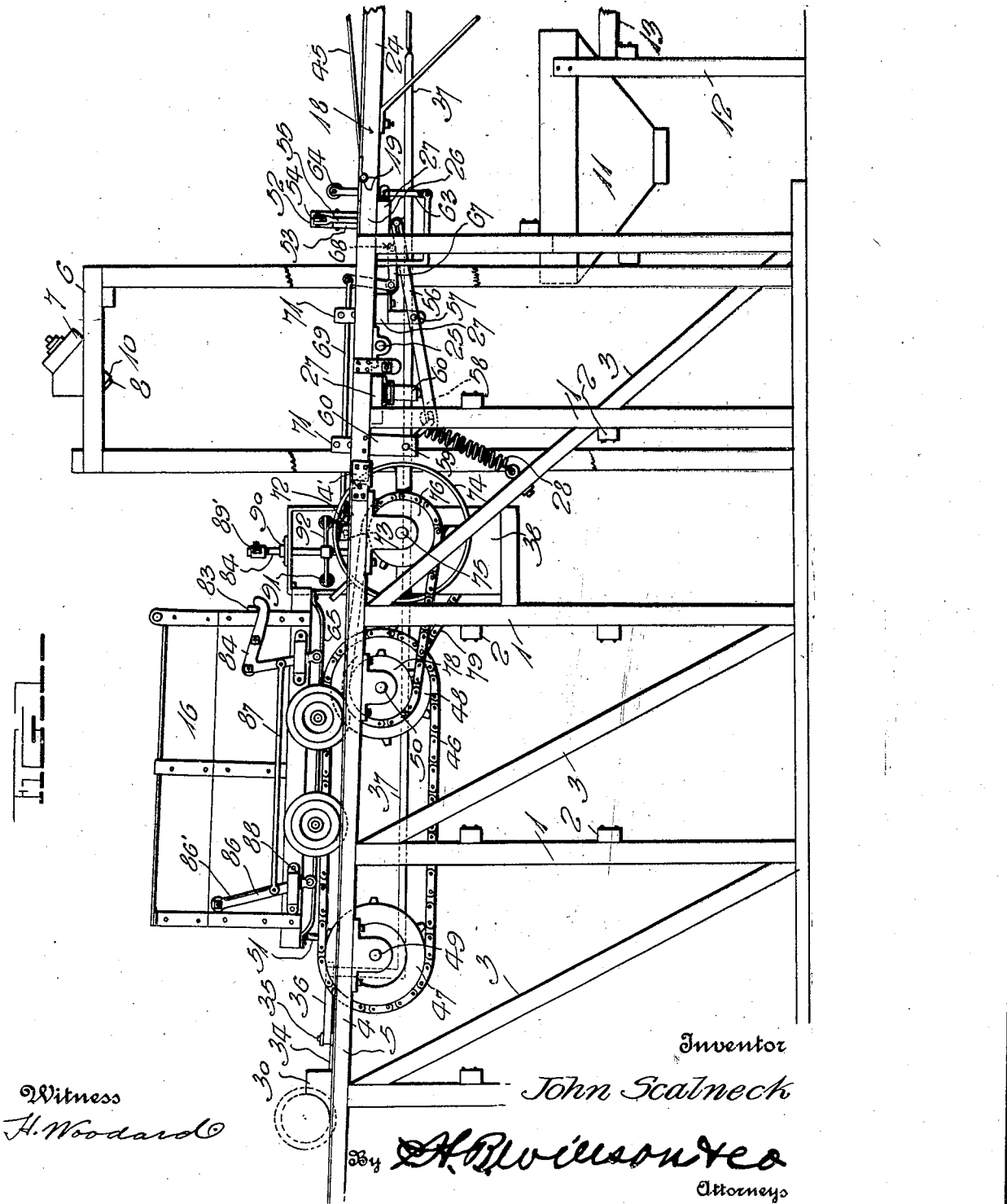

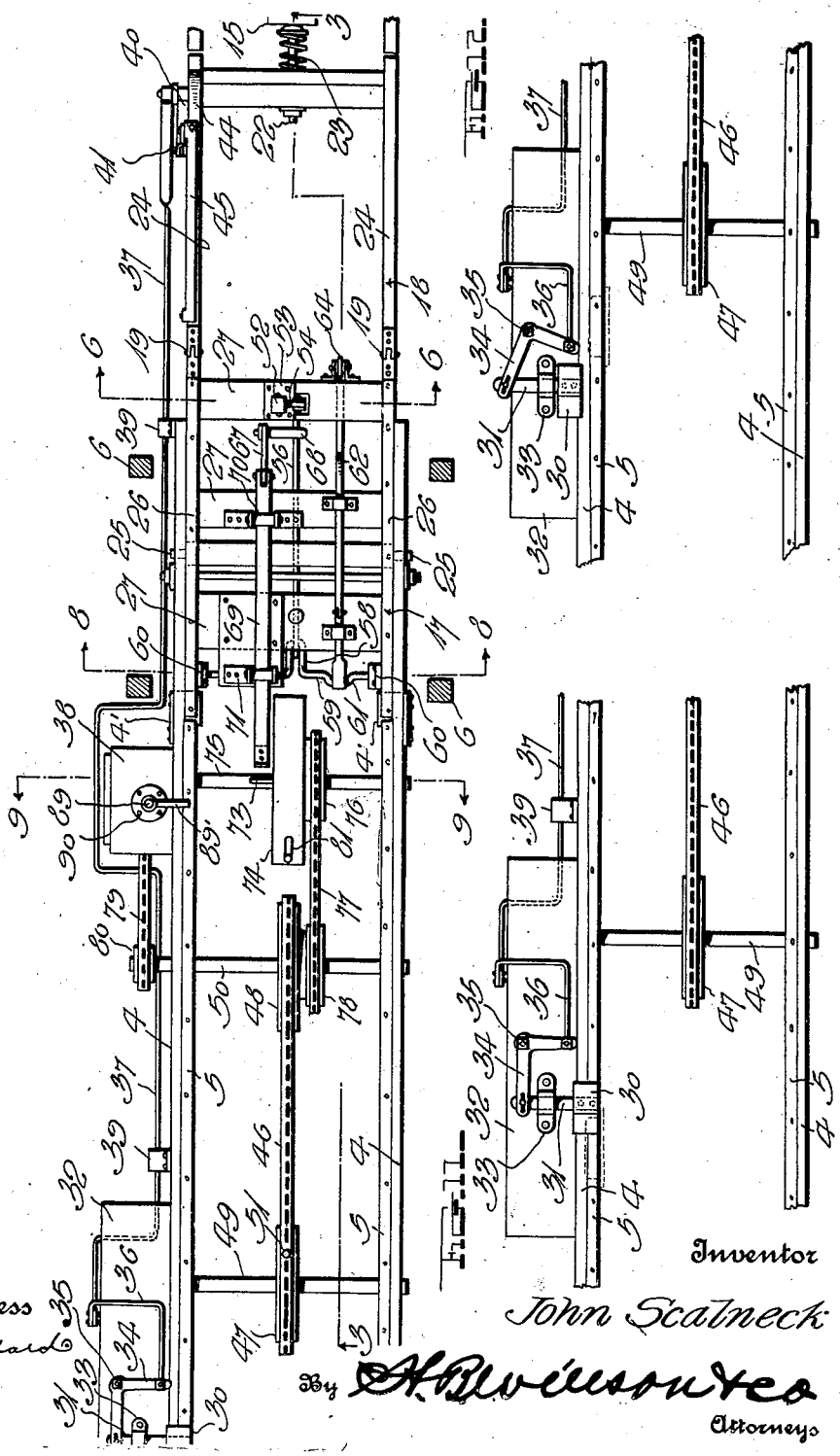

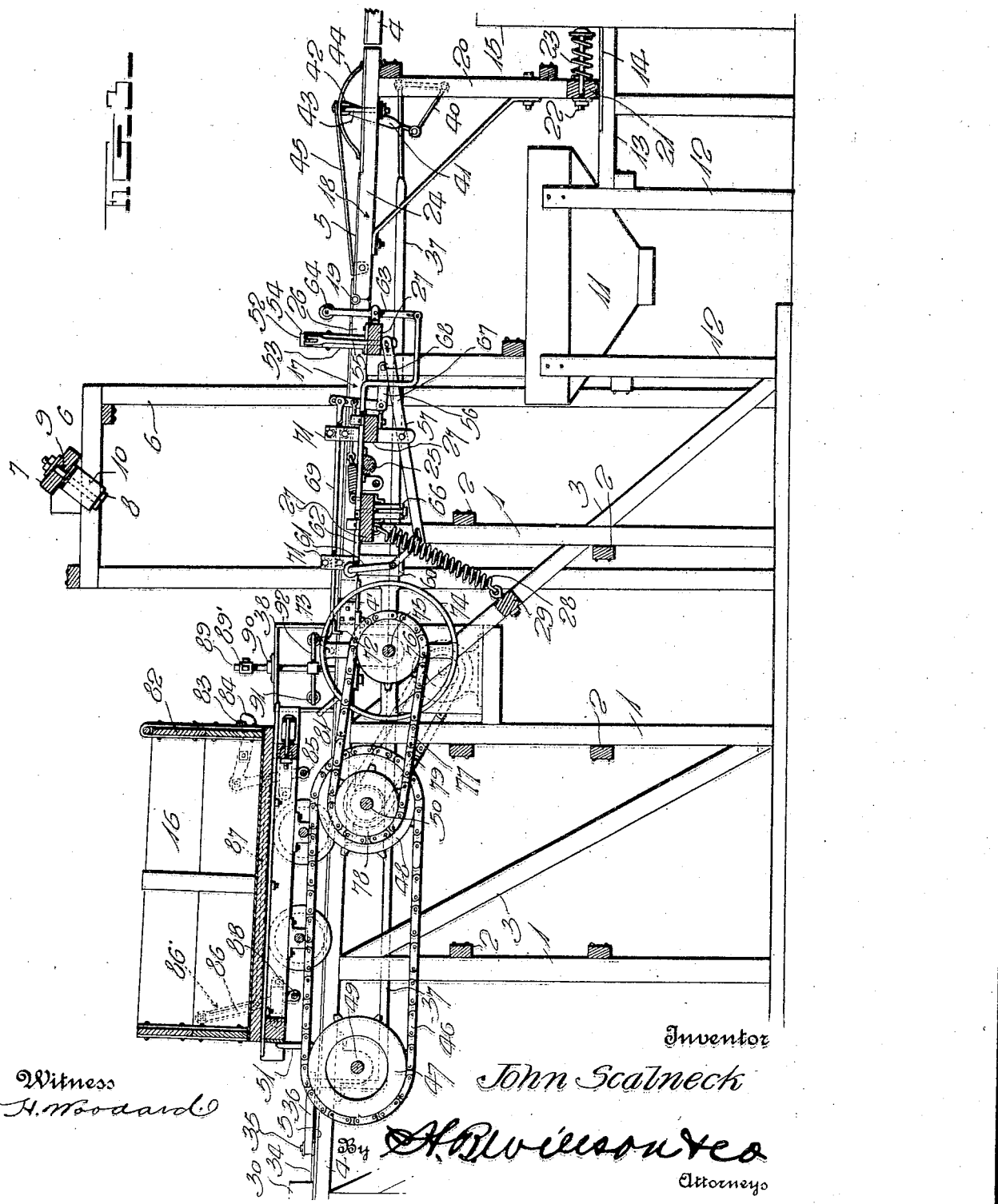

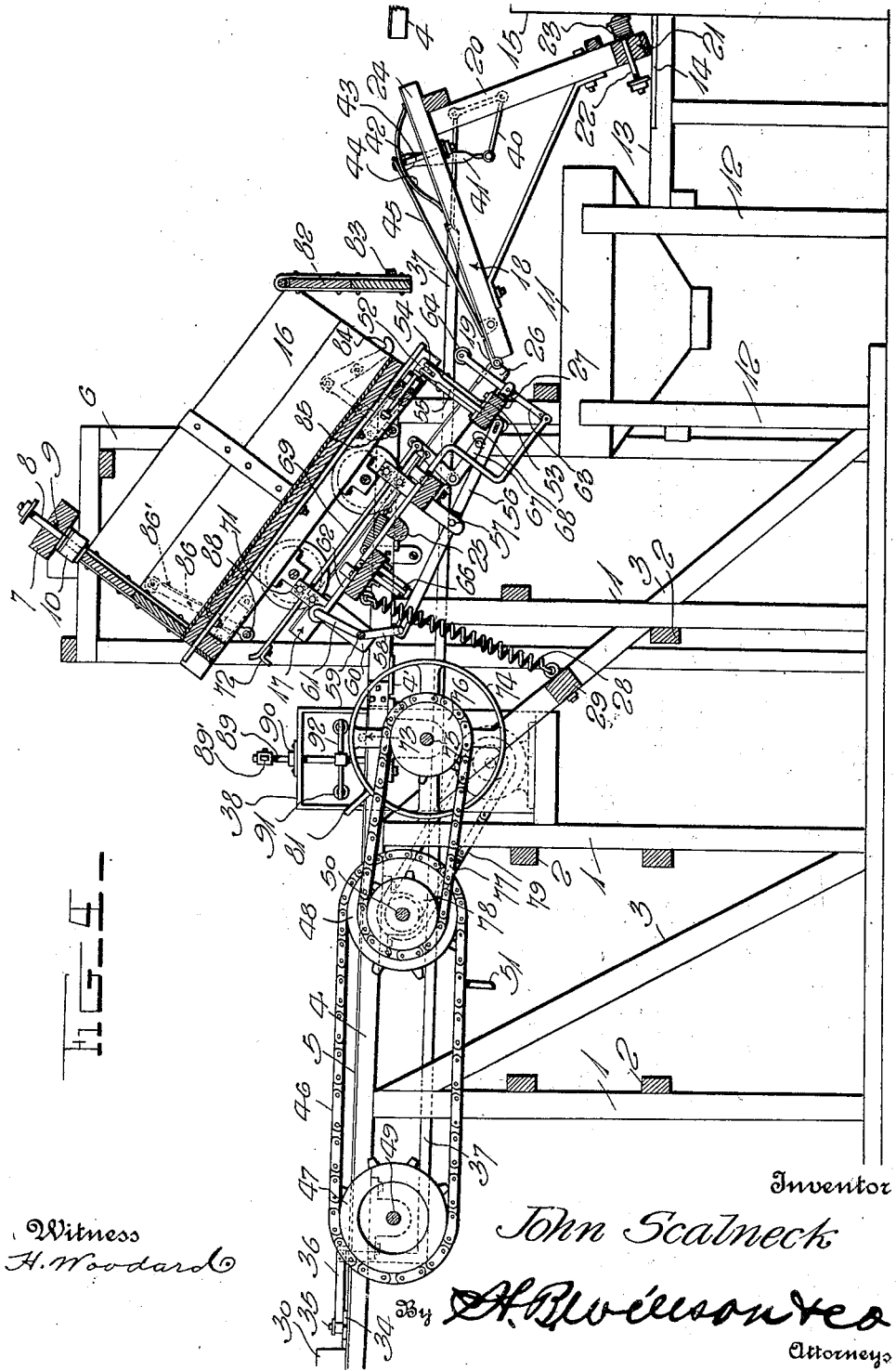

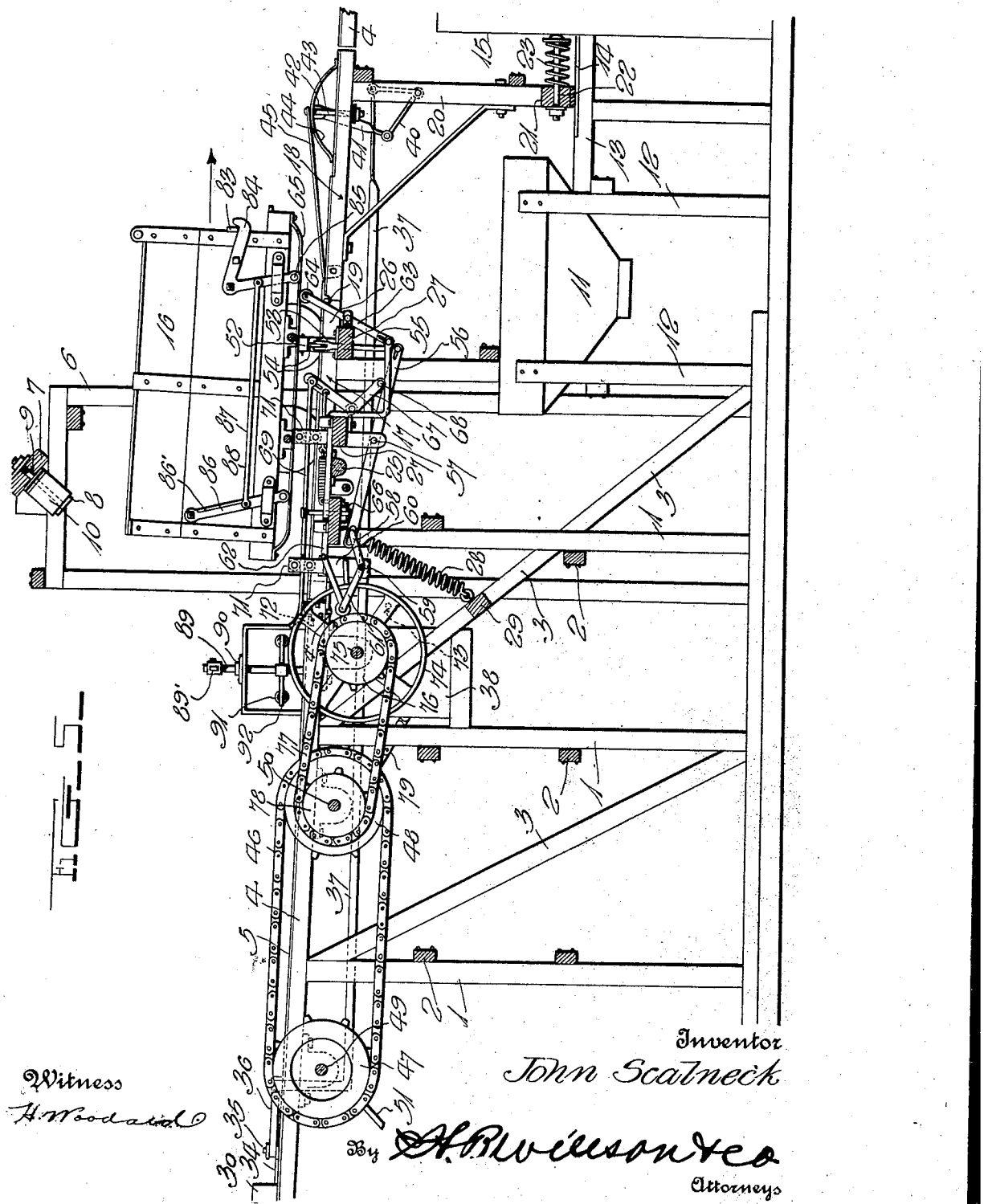

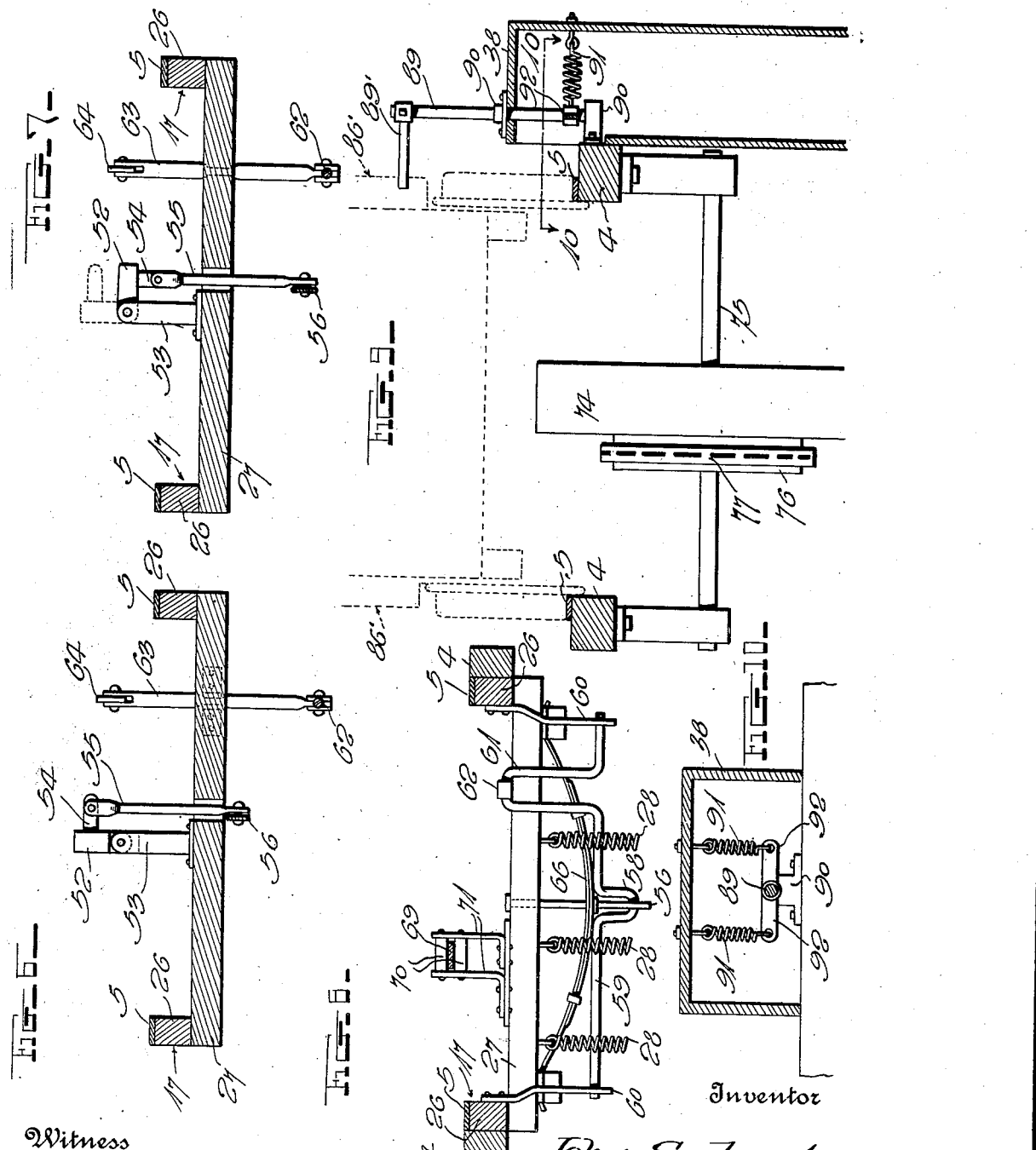

1,442,300

UNITED STATES PATENT OFFICE.

JOHN SCALNECK, OF MONONGAHELA, PENNSYLVANIA.

CAR-DUMPING DEVICE.

Application filed June 4, 1921. Serial No. 474,905.

*To all whom it may concern:*

Be it known that I, JOHN SCALNECK, residing at Monongahela city, in the county of Washington and State of Pennsylvania, have invented certain new and useful Improvements in Car-Dumping Devices; and I do declare the following to be a full, clear, and exact description of the invention, such as will enable others skilled in the art to which it appertains, to make and use the same.

This invention relates to an improved car dumping device and one object of the invention is to provide a car dumping device having a trestle construction which includes pivotally mounted dumping sections upon which the loaded car will move and the weight of the loaded car cause the dumping sections to tilt thus permitting the material in the car to pass out of the car after which the tilting dumping sections will be returned to the normal horizontal position by yieldable means which normally retain them in the horizontal position.

Another object of the invention is to provide improved means for releasably holding the car upon one section of the tilting structure and thus prevent the loaded car from moving off of the main tilting section onto the auxiliary tilting section while the car is being dumped.

Another object of the invention is to construct and mount the car holding device that it may be moved to an inoperative position and retained in the inoperative position while the car is moving off of the main tilting section onto the auxiliary tilting section after the load has been dumped.

Another object of the invention is to provide improved means for moving a loaded car onto the main tilting or dumping section and to so construct this means for moving the loaded car onto the tilting section that means for releasing the car holding device and moving a car off of the main tilting section may be operated from the means for moving the loaded car onto the main tilting section.

Another object of the invention is to provide an improved chock for controlling movement of a loaded car towards the main tilting section and to further provide this chock with actuating means for moving it to an inoperative position, the actuating means being extended to the auxiliary tilting section for engagement by a car passing off of the auxiliary tilting section. It will thus be seen that with this improved construction a car which has been dumped and is moving off of the auxiliary tilting or dumping section will act to release the chock and permit a car held thereby to move into position for passing onto the main dumping or tilting section of the trestle.

Another object of the invention is to provide the car with an improved type of door securing latch and to provide upon the trestle an improved device for moving the latch to release the door as the car moves upon the main tilting section.

Another object of the invention is to so construct the trestle structure that there will be no danger of the car overturning as the tilting section moves to dump the contents of the car.

This invention is illustrated in the accompanying drawings, wherein:—

Figure 1 is a view showing the improved car dumping device in side elevation,

Figure 2 is a top plan view of the improved car dumping device,

Figure 3 is a longitudinal sectional view through the car dumping device, taken on the line 3—3 of Figure 2, Figure 4 is a view similar to Figure 3 with the car moved upon the main tilting or dumping section and in a tilting or dumping position, Figure 5 is a view similar to Figures 3 and 4 showing the emptied car moving off of the main tilting section onto the auxiliary tilting section, Figure 6 is a fragmentary transverse sectional view taken along the line 6—6 of Figure 2, Figure 7 is a view similar to Figure 6 showing the car holding element thereof moved to an inoperative position, Figure 8 is a transverse sectional view taken along the line 8—8 of Figure 2, Figure 9 is a transverse sectional view taken along the line 9—9 of Figure 2, Figure 10 is a sectional view taken along the line 10—10 of Figure 9, Figure 11 is a fragmentary top plan view of the dumping device showing the construction and mounting of the chock for engaging a wheel of the car, and Figure 12 is a view similar to Figure 11 showing the chock moved to an inoperative position.

This improved car dumping device includes a trestle structure having supporting standards 1 which are braced by cross bars 2 and diagonally bracing bars 3 and carries rails 4 which will be protected by strips 5 so that the portions of the rails engaged by the wheels of the cars may be renewed when necessary. A bumper frame 6 is positioned intermediate the length of the trestle and carries a cross bar 7 having a plunger 8 slidably mounted through an opening 9 and engaged by a relatively heavy leaf spring 10 so that when the car is in the dumping position shown in Fig. 4, the plunger may be moved against the action of the spring. A hopper 11 is positioned adjacent the frame 6 and beneath the rails 4 and is supported by posts 12 so that coal or other material in the cars may be caught when delivered upon a pile below the trestle. A platform 13 is supported adjacent this hopper and is provided with a protecting plate 14 which is positioned at the bottom of an abutment 15.

In order to dump the cars 16 as shown in Fig. 4, the trestle has been provided with a main tilting or dumping section 17 and an auxiliary tilting or dumping section 18 which is hingedly connected with the main tilting section by hinges 19. Supporting bars 20 extend downwardly from beneath the free end portions of the auxiliary tilting section and carry a cross bar 21 having an opening formed therein to receive the plunger 22 which is yieldably held in the position shown in Fig. 2 by the springs 23. This plunger engages the abutment 15 and, therefore, the support 20 will be normally held in a vertical position as shown in Fig. 3 but may be moved to the inclined position shown in Fig. 4. The space between the rails 24 of the auxiliary tilting section is left clear so that there will be nothing to obstruct the passage of the coal from the car down into the hopper 11 when the main tilting or dumping section swings upon the pivot shaft 25 but the side rails 26 of the main tilting section are connected by cross beams 27, one of which is engaged by a spring 28 which has its lower end connected with a cross beam 29 carried by certain of the bracing beams 3 and serve to yieldably retain the main tilting or dumping section in a horizontal position.

When a loaded car is approaching the tilting sections of the trestle, it is desired to prevent a car from moving too close to the tilting sections until a car which is being dumped has moved off from the two tilting sections and in order to temporarily hold the approaching car against movement along the tracks, there has been provided a chock 30 which is movable into and out of an operative position as shown in Figs. 11 and 12 and is carried by an arm 31 which is slidably connected with the supporting platform 32 by a strap 33. This arm 31 is connected with a bell crank lever 34 pivotally mounted upon the platform 32 as shown at 35 and has its second arm connected with a draw rod 36. This rod 36 is extended outwardly to the side of the platform 32 and is connected with the upper end of an arm which extends upwardly from the rod 37 which rod 37 extends longitudinally of the trestle as shown in Fig. 2 and about the housing 38 and is slidably connected with the trestle by the guide 39. A bell crank lever 40 is pivotally connected with the support 20 of the auxiliary tilting section and has one arm connected with the rod 37 and the second arm connected with a plunger 41. This plunger 41 extends upwardly to a point above the rails or tracks of the auxiliary tilting section and is connected with the ear 42 of the strip 45. A pin 43 is slidably mounted in an opening formed in the rails and is engaged by a leaf spring 44 and also by the strip 45 so that the wheel of a car can easily move into engagement with the chock actuating mechanism and hold this chock in an inoperative position while the car which has been emptied is moving off of the auxiliary tilting section of the trestle and a loaded car is moving towards the main tilting section beyond the chock. After the car which has been emptied has passed off of the auxiliary tilting section, the chock actuating mechanism will be released and the springs 44 will return it to the normal position with the chock extended across the rails as shown in Fig. 11. It will thus be seen that the cars will be permitted to pass onto the tilting structure in the proper timed relation.

The track or trestle is inclined somewhat towards the main tilting section so that a car will coast onto the tilting section, but occasionally a car will not move along the track with sufficient speed to properly move upon the tilting section and, therefore, there has been provided means for engaging the car and moving it upon the main tilting section. This means includes a sprocket chain 46 which passes about sprocket wheels 47 and 48, the sprocket 47 being an idler sprocket and mounted upon a shaft 49 and the sprocket 48 being a driving sprocket and mounted upon a driving shaft 50. This sprocket chain carries a car engaging arm 51 which engages the car and will push the car upon the main tilting section in case the car does not move along the tracks a sufficient distance to rest upon the main tilting section.

When the loaded car is on the main tilting section and the main tilting section swings to the position shown in Fig. 4, it is necessary to prevent the car from moving downwardly and it is also necessary to prevent the car from moving off of the main tilting section onto the auxiliary tilting section before its load has been dumped into the hopper. In order to do so, there has been provided a block 52 which is pivotally connected with a bracket 53 carried by one of the cross beams 27. This block 52 is provided with a lever arm 54 which is connected with a link 55 which extends downwardly and is pivotally connected with the rocker arm 56. This rocker arm 56 is fulcrumed as shown at 57 and is loosely connected with the crank extension 58 of the crank shaft 59. This crank shaft is mounted in hanger brackets 60 and provided with a second crank extension 61 which is connected with a rod 62, the rod 62 being carried longitudinally of the main tilting section and having its forward end connected with the rocker arm or lever 63. This lever 63 extends upwardly above the track and carries a roller 64 for engagement by a strip 65 mounted upon the car so that after the block has been moved to a lowered position the roller may engage the strip 65 and the mechanism thus retained in the position shown in Fig. 5 until the car has left the auxiliary tilting section. It will thus be seen that the spring 66 which engages the rocker arm 56 cannot return the block 52 to the raised position until the car has moved off of the auxiliary tilting section and premature return of the block to the raised or operative position will be prevented. In order to move the rocker bar 56 to draw the link 55 downwardly, there has been provided a bell crank lever 67 which is pivotally connected with one of the cross beams 27 and has one arm provided with a pin 68 for engaging the rocker bar 56 and has its second arm connected with a push rod 69 which extends rearwardly between the rollers 70 carried by the brackets 71. This push bar 69 carries an abutment 72 for engagement by a pin 73 which extends transversely from the wheel 74 mounted upon a shaft 75. This shaft 75 carries a sprocket wheel 76 which is engaged by a sprocket chain 77 for transmitting rotary movement from the sprocket wheel 78 of the driving shaft 50. It will thus be seen that when the driving shaft 50 is rotated by the sprocket chain 79 which passes about the sprocket wheel 80 of the shaft 50 and about a sprocket wheel mounted upon the shaft of a motor mounted in the lower portion of the housing 38, the wheel 74 will be rotated and the pin 73 may engage the bar 69 to move the bar forwardly and swing the rocker bar 56 to draw the block 52 to the inoperative position. The wheel 74 in addition to the pin 73 carries a car engaging pin 81 for engaging the car after the block has been swung to the lowered position and moving the car so that it will pass off the main tilting section and over the auxiliary tilting section onto the main portion of the trestle beyond the auxiliary tilting section.

The door 82 of the car 16 is provided with a keeper 83 which extends beyond the sides of the door for engagement by the bell crank latching levers 84. These latches 84 are pivotally connected with the sides of the car and are connected by a cross rod 85 which extends beneath the car and these latches 84 are connected with actuating arms 86 by links 87. These arms 86 are pivotally connected with the car and connected by a cross rod 88 and these arms are provided with side flanges 86 one of which will be engaged by a releasing device as shown in Fig. 9. This releasing device is provided with the arm 89′ for engaging the flange 86′ and this arm is carried by a standard 89 which is extended into the housing 38 and journaled in the bearings 90 so that the shaft may rotate and swing out of the way after the latch has been moved to the releasing position. Springs 91 are connected with side arms 92 which extend from the standard 89 and will serve to yieldably retain the standard against rotation with the abutment arm 89′ extending towards the track.

When this device is in use, the loaded cars move along the track until the first car is stopped by the chock. The chock can then be moved to one side to permit the first car to pass and return to the operative position to engage and stop the second car. The first car will coast along the track to the main tilting section and if it does not move with sufficient speed to roll upon the main tilting or dumping section, the pin 51 will engage the car as shown in Fig. 3 and move the car onto the main tilting section. As the car moves upon the main tilting section, the arm 89′ will engage the outstanding flange of the lever arm 86 upon that side of the car and the latch will be moved to the inoperative position thus releasing the door 82. The car will roll upon the main tilting section until it engages the abutment block 52 which will stop its movement and the weight of the car will cause the main tilting section to tilt forwardly to the position shown in Fig. 4. The auxiliary tilting section will also tilt as shown and the rear end portion of the car will engage the bumper 10 thus retaining the car in the tilted position with the door swinging open to permit the coal or other substance in the car to pass out of the open end and down into the hopper 11. As the coal is emptied, the spring 28 will return the tilting sections to the horizontal position and as the wheel 74 rotates the pin 73 will engage the abutment 72 of the bar 69 and rock the bell crank lever 67 to swing the rocker bar 56 downwardly and draw the lock 52 to the lowered position. The pin 81 will then engage the car and move the car forwardly with the strip 65 engaging the roller of the lever 63 and retaining the abutment lock in the lowered position until the car has passed off of the auxiliary tilting section. As the car moves across the auxiliary tilting section, the wheel will engage the strip 45 and press it downwardly thus moving the plunger 41 downwardly and rocking the bell crank lever 40 to move the rod 37 longitudinally and rock the bell crank 34 to draw the block 30 to the inoperative position and thus release the next car and permit it to travel towards the main dumping section. It will thus be seen that the cars will move towards the main dumping section in the proper timed relation, each car in its turn being released and permitted to move towards the dumping section by the empty car which is passing off of the auxiliary tilting or dumping section. A car dumping device has thus been provided which will be substantially automatic in its operation and will be very effective in use.

What I claim is:—

1. A car dumping device comprising a trestle structure having rails mounted thereon, the trestle having a main dumping section pivotally mounted and an auxiliary section pivotally connected with the main dumping section, a support for the auxiliary section extending from the free end portion of the auxiliary section, and means yieldably retaining the dumping sections in substantial alinement.

2. A car dumping device comprising a trestle structure having a main dumping section pivotally mounted and an auxiliary section hingedly connected with the main section, a depending support extending from the free end of the auxiliary section and providing a bodily movable fulcrum, and means engaging the main dumping section to yieldably retain the dumping section in substantial alinement.

3. A car dump comprising a trestle structure having a pivotally mounted main dumping section and an auxiliary dumping section hingedly connected thereto, means for engaging a car and moving the car onto the main dumping section, and means for engaging a car and moving a car off of the main dumping section.

4. A car dump comprising a trestle structure having a pivotally mounted main dumping section and an auxiliary dumping section hingedly connected thereto, means for engaging a car and moving the car onto the main dumping section, means for engaging a car and moving the car off of the main dumping section, and means for releasably holding a car against movement off of the main dumping section, the holding means being moved to a releasing position by the means for moving the car off of the main section.

5. The structure of claim 4 and means carried by the car for retaining the holding means in an inoperative position during passage of the car off of the main dumping section.

6. A car dump comprising a trestle structure having a pivotally mounted main dumping section and an auxiliary dumping section hingedly connected thereto, means for engaging a car and moving the car off of the main dumping section, means for releasably holding a car against movement off of the main dumping section, and means for moving said holding means to an inoperative position, the holding means and means for moving the same to an inoperative position comprising a movably mounted car engaging block, a crank shaft, a draw rod connected with the block, a link connecting the draw rod with the crank shaft, a bell crank lever having one arm engaging the link, and a push rod connected with the second arm of the bell crank lever and slidably mounted for movement longitudinally of the trestle and extending for engagement by the car moving means.

7. The structure of claim 6 and a push rod connected with the crank shaft, and a lever pivotally connected with the main dumping section of the trestle and having one end connected with the push rod and the second end portion extending for engagement by a car element to retain the car engaging block in an inoperative position.

8. The structure of claim 4 having the means for moving a car onto and off of the main dumping section and moving the car holding means to a releasing position comprising a driving shaft, a driven shaft rotated from the driving shaft, a wheel carried by the driven shaft and having a car engaging element and an element for engaging and moving the car holding means to a releasing position, and an endless element driven from the driving shaft and having means for engaging a car to move the car onto the main dumping section.

9. The structure of claim 4 having the car holding means moved to a releasing position prior to engagement of the car by the means for moving the car off the main dumping section.

10. A car dump comprising a trestle structure having a pivotally mounted main dumping section, an auxiliary dumping section hingedly connected with the main dumping section, and a chock movably mounted for movement into and out of operative relation to a rail in advance of the main dumping section, and means for moving the chock to an inoperative position including an actuating element movably mounted in connection with the auxiliary dumping section for engagement by a car passing over the same, and means connecting the actuating element with said chock to move the chock towards an inoperative position when the car passes over the auxiliary dumping section.

11. The structure of claim 10 having the chock slidably mounted, a lever connected with the chock, a lever connected with the auxiliary dumping section, an actuating element for the last named lever movably mounted and yieldably held in a set position and a rod extending longitudinally of the trestle structure and connecting the levers.

12. The structure of claim 10 having the actuating element comprising a slidably mounted plunger, a spring element holding the plunger in a raised position, and a pressing strip leading from the plunger.

13. A car dump comprising a trestle structure including a dumping section, a car having a door mounted for movement into and out of a closed position, latching means releasably holding the door in a closed position, and means carried by the trestle structure for moving the latching means to an inoperative position, the latch releasing means comprising a rotatably mounted standard, a latch engaging arm extending from the standard, side arms extending from the standard and resilient means connected with said side arms to yieldably retain the standard against rotary movement.

14. The structure of claim 13 having the latching means comprising a bell crank keeper engaging levers, actuating levers having outstanding abutment engaging flanges, and links connecting the levers.

In testimony whereof I have hereunto set my hand in the presence of two subscribing witnesses.

JOHN SCALNECK.

Witnesses:
CLARENCE O. DEVORE,
UNA STURDEVANT.